May 14, 1946.  J. M. PORTER  2,400,165
AUTOMATIC PARACHUTE RELEASE COUPLING
Filed May 18, 1945
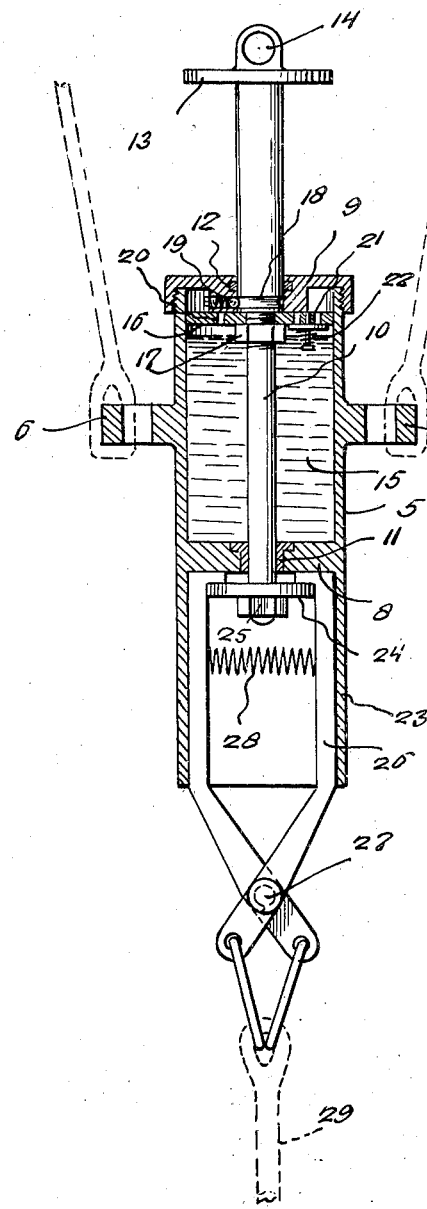
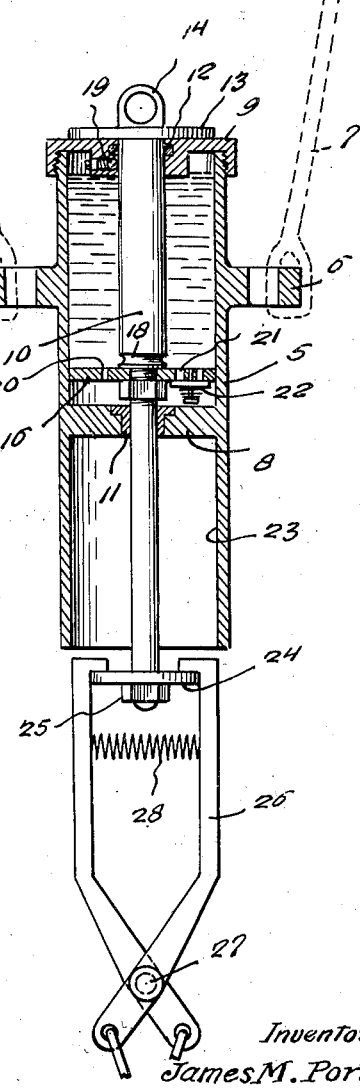
Inventor
James M. Porter,
By
Attorneys Patented May 14, 1946

2,400,165

UNITED STATES PATENT OFFICE 2,400,165

AUTOMATIC PARACHUTE RELEASE COUPLING

James M. Porter, Westalton, Mo.

Application May 18, 1945, Serial No. 594,561

1 Claim. (Cl. 294—83)

The present invention relates to new and useful improvements in automatic release couplings, and more particularly to a coupling of this character for cargo parachutes by means of which a load may be safely suspended until it has been lowered to the ground or a supporting surface, whereupon the load will be automatically released from the parachute.

In the unloading of cargo from airplanes by means of parachutes, it is important that the load be safely secured to the parachute during its descent, and to immediately release the parachute from the load when the load strikes the ground in order that the load will not be dragged over the ground by the parachute, by wind pocketed in the parachute.

It is accordingly an object of the present invention to provide an automatic release coupling between the parachute and the load by means of which the load is positively secured in suspended position during descent of the parachute, and as soon as the load reaches the ground and the parachute is relieved of the weight thereof, the coupling will automatically open to detach the load from the parachute.

A further object of the invention is to provide a device of this character of simple and practical construction, which is efficient and reliable in operation, relatively inexpensive to manufacture, and otherwise well adapted for the purposes for which the same is intended.

Other objects and advantages reside in the details of construction and operation as more fully hereinafter described and claimed, reference being had to the accompanying drawing forming part hereof, wherein like numerals refer to like parts throughout, and in which:

Figure 1 is a vertical sectional view of the coupling prior to subjecting the same to the weight of the load.

Figure 2 is a similar view showing the jaws of the coupling in their lowered position ready for releasing when relieved from the weight of the load.

Referring now to the drawing in detail, wherein for the purpose of illustration I have disclosed a preferred embodiment of the invention, the numeral 5 designates a cylinder having an apertured flange 6 adjacent its upper portion and to which the shrouds 7 of a parachute are attached. The cylinder 5 is formed with a partition 8 intermediate its ends, the lower end of the cylinder below the partition being open and the upper end of the cylinder being closed by a threaded cap 9.

A rod 10 is slidably mounted in the partition 8 as well as in the cap 9 by means of liquid-tight bushing or packing 11 and 12, respectively, the upper end of the rod 10 projecting above the cap 9 and formed at its upper end with a flange 13 forming a stop limiting downward movement of the rod and above which is formed an eye 14 providing a finger grip for raising the rod in the cylinder.

The upper portion of the cylinder 5 is adapted to contain oil or other suitable liquid 15 and to the intermediate portion of the rod 10 is secured a plunger 16 by means of a nut 17 threaded on the rod, the plunger having a working fit in the cylinder.

Above the plunger 16 the rod is formed with an annular groove 18 adapted for receiving a spring-projected ball 19 carried by the cap 9 for releasably securing the rod in its upwardly raised position with the plunger 16 in the upper end of the cylinder 5.

The plunger 16 is formed with a bleed port 20 to retard the lowering movement of the plunger in the cylinder and the plunger is also provided with a port 21 providing communication between the upper and lower portions of the cylinder, the port 21 being normally closed by a spring-actuated disc valve 22 positioned at the under side of the plunger.

During a raising movement of the rod 10 and plunger 16 in the cylinder, the valve 22 is responsive to pressure created in the upper portion of the cylinder to open the valve and thus permit free raising movement of the rod and the plunger into the position shown in Figure 1 of the drawing, the rod and plunger being releasably secured in their raised position by means of the ball 19 seated in the groove 18.

The lower portion of the cylinder 5 below the partition 8 forms an open chamber 23 in which the lower end of the rod 10 projects and to the lower end of the rod is secured a disc 24 by means of a nut 25.

The diameter of the disc 24 is less than the diameter of the chamber 23 to receive a pair of hooks or jaws 26 which are pivotally connected to each other near their lower ends by means of a pin 27 and with the upper ends of the hooks projecting horizontally toward each other to overlie the disc 24 and thus support the hooks in a suspended position on the disc.

An expansible coil spring 28 is positioned between the upper end portions of the hooks 26 to urge the hooks into open position out of engagement with the disc 24 when the hooks are lowered into a position below the lower edge of the cylinder 5 upon a lowering movement of the rod 10 and plunger 16, into the position shown in Figure 2 of the drawing.

The cargo or other object may be attached to the lower ends of the hooks 26 by means of a rope or cable 29.

In the operation of the device, after the load is attached to the lower end of the hooks 26, the hooks are engaged over the disc 24 and the rod 10 pulled upwardly in the cylinder 5 into the position shown in Figure 1, and is held releasably in such position by the ball catch 19.

When the parachute is released from the plane, the load on the rod 10 will release the rod from the catch 19 and the rod will gradually move downwardly in the cylinder during descent of the parachute until it reaches the position shown in Figure 2.

When the load reaches the ground the hooks 26 are relieved of the weight thereof and the spring 28 will open the hooks 26 to disengage the disc 24 and thus release the load from the parachute.

Having thus described the invention, what I claim is:

A cargo release coupling for parachutes comprising a cylinder closed at each end and adapted for attaching to the shrouds of a parachute, a plunger working in the cylinder and embodying dash-pot means retarding lowering movement of the plunger in the cylinder, said cylinder having an open chamber at its lower end, a rod attached to the plunger and projecting downwardly into the chamber, a pair of spring-biased cargo-attaching hooks releasably connected to the lower end of the rod and retained in connection position by the weight of an object attached thereto, and spring means carried by the hooks for moving the same into releasing position when relieved from the weight of the object by the object resting on the ground.

JAMES M. PORTER.